Jan. 27, 1970             K. H. WIRTH             3,492,370
SULFUR VULCANIZABLE BLENDS COMPRISING DIOLEFIN
RUBBER AND E.P.D.M. TERPOLYMERS
Filed May 9, 1966
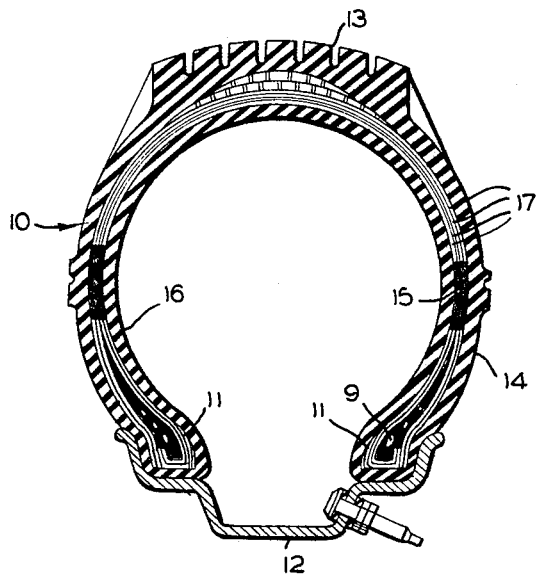
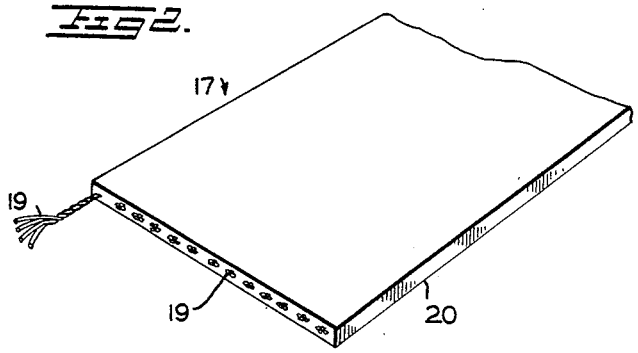
INVENTOR
KENNETH H. WIRTH
BY Shanley & O'Neil
ATTORNEY United States Patent Office 3,492,370
Patented Jan. 27, 1970

3,492,370
SULFUR VULCANIZABLE BLENDS COMPRISING DIOLEFIN RUBBER AND E.P.D.M. TERPOLYMERS
Kenneth H. Wirth, Baton Rouge, La., assignor to Copolymer Rubber & Chemical Corporation, a corporation of Louisiana
Filed May 9, 1966, Ser. No. 548,614
Int. Cl. C08c 9/14; C08d 9/08
U.S. Cl. 260—889         15 Claims

ABSTRACT OF THE DISCLOSURE

This invention relates to sulfur vulcanizable blends prepared from a diolefin rubber and an interpolymer comprising ethylene, at least one straight chain monoolefin containing 3–16 carbon atoms and a polyunsaturated bridged ring hydrocarbon containing at least one ethylenic double bond in one of the bridged rings. The blends are particularly useful as adhesives in the preparation of rubber laminates.

---

This invention relates to novel sulfur vulcanizable elastomeric blends prepared from highly unsaturated hydrocarbon rubbers, and rubbers characterized by a relatively low degree of unsaturation prepared by interpolymerizing a monomeric mixture containing ethylene, a monoolefin having 3–16 carbon atoms, and a polyolefin. The invention further relates to adhesives which are especially useful in preparing laminants from normally incompatible rubbery polymers of the above classes, and to a method of preparing laminants utilizing such adhesives. The invention still further relates to the sulfur vulcanized elastomeric blends and the laminants prepared in accordance with the invention. The invention also relates to an improved method of manufacturing pneumatic tires, and to the pneumatic tires thus prepared.

Natural rubber and highly unsaturated synthetic hydrocarbon rubbers such as styrene-butadiene rubber, cis-1,4-polybutadiene, and cis-1,4-polyisoprene are employed in the manufacture of a wide variety of rubber articles. However, these rubbers are subject to rapid attack by elemental oxygen and especially ozone, and they have disadvantages when used in applications where resistance to oxidative degeneration is important. The resistance to oxidation can be improved somewhat by the addition of antioxidants. However, this increases the cost of the rubber and also many of the antioxidants are staining.

It is known that oxidation resistant elastomers may be prepared by interpolymerizing a monomeric mixture composed of ethylene and at least one higher straight chain alpha monoolefin in solution in an organic solvent and in the presence of a Ziegler polymerization catalyst. However, the resulting saturated elastomers are not sulfur vulcanizable and substances other than sulfur must be used for curing purposes, such as the organic peroxides. Efforts have been made to provide a low degree of ethylenic unsaturation by including a reactive monomeric polyolefin in the mixture of straight chain alpha monoolefins to be polymerized. The resulting interpolymers contain about 2–5 carbon-to-carbon residual double bonds per 1000 carbon atoms, and they may be readily cured with sulfur following prior art practices. The resulting vulcanized elastomeric products have excellent ozone resistance and are not subject to rapid oxidative degeneration.

In the interest of simplifying the discussion, the sulfur curable elastomers prepared by interpolymerizing a monomeric mixture containing ethylene, a higher monoolefin containing 3–16 carbon atoms and a polyolefin may be referred to herein as ethylene-propylene-diolefin monomer (EPDM) rubbers, as this represents the presently preferred monomeric mixture. However, when this term is used it is understood that interpolymerizable straight chain monoolefins containing 4–16 carbon atoms may be substituted for at least part of the propylene, and that interpolymerizable polyolefins in general may be substituted for all or part of the diolefin monomer.

It was reasoned heretofore that blends prepared from the highly unsaturated hydrocarbon rubbers mentioned above and the relatively low unsaturated sulfur vulcanizable EPDM rubbers should have a combination of good ozone resistance and good physical properties in the vulcanized state. However, this is not the case, as the prior art blends invariably have markedly lower physical properties. The EPDM rubber acts as a filler and it is not covulcanized to produce a product which has physical properties approximating those of the highly unsaturated hydrocarbon rubber alone. The art has long sought an entirely satisfactory EPDM rubber which will covulcanize readily with the highly unsaturated hydrocarbon rubbers, to thereby provide the desirable combination of good ozone resistance and high physical properties in the resulting vulcanizates.

The incompatibility of highly unsaturated hydrocarbon rubbers and the EPDM rubbers used in the prior art has prevented the preparation of entirely satisfactory laminates therefrom. For instance, it has not been possible prior to the present invention to tightly adhere a lamina of the highly unsaturated hydrocarbon rubbers to a lamina of EPDM rubber in a convenient and satisfactory manner, and with the resulting bond having a strength which is comparable with that of the individual rubbers. As a result, the bond ruptures and the various laminae separate when the laminate is subjected to stress and strain during use. This problem of the prior art has been especially troublesome in the manufacture of certain reinforced rubber articles having an essentially laminated structure, such as pneumatic tires, high pressure hoses and heavy conveyor belts, where during the manufacturing steps sulfur vulcanizable rubber laminae are superimposed one on the other and then tightly adhered together during the vulcanizing step. The various laminae in the unvulcanized article must bond together sufficiently prior to the vulcanizing step to allow it to be assembled and handled. It has been impractical to construct pneumatic tires from EPDM rubber prior to the present invention due to the combination of the lack of surface tact, i.e., the inability of the various uncured rubber laminae to bond sufficiently in the initial green state to enable the unvulcanized article to be readily constructed and handled prior to the vulcanizing step, and the incompatibility of EPDM with tackifying agents such as natural rubber and/or cis-1,4-polyisoprene. The present invention also overcomes the above disadvantages and shortcomings of the prior art laminating processes which use EPDM rubber in an entirely satisfactory manner for the first time.

It is an object of the present invention to provide novel sulfur vulcanizable blends of highly unsaturated hydrocarbon rubbers, EPDM rubbers, and the vulcanizates prepared therefrom.

It is a further object to provide novel tackifying and adhesive compositions which are especially useful in constructing laminates from laminae of highly unsaturated hydrocarbon rubbers and EPDM rubbers.

It is still a further object to provide a novel method of preparing laminated rubber articles from laminae including highly unsaturated hydrocarbon rubbers and EPDM rubbers, and the laminates thus prepared.

It is still a further object to provide a novel method of manufacturing pneumatic tires from EPDM rubber, and the pneumatic tires thus prepared.

Still other objects and advantages of the invention will be apparent to those skilled in the art upon reference to the following detailed description and the accompanying examples.

The sulfur vulcanizable elastomeric blends of the invention may contain about 5–95% by weight of the highly unsaturated hydrocarbon rubber, and about 95–5% by weight of the special EPDM rubber described hereinafter. Unexpectedly, the rubbers in such blends have been found to covulcanize, and the EPDM rubber does not act as a filler as in the prior art compositions. Thus, the physical properties of the resulting vulcanizates are not degraded to the extent that is true of the prior art blends. In instances where it is desired to impart outstanding ozone resistance to the blend, then the EPDM rubber should be present in an amount of at least 15% by weight, and preferably in an amount of about 15–30% by weight.

In instances where the blend is to be used as a tackifying agent and adhesive, it is preferred that the blend contain about 20–70% of natural rubber or cis-1,4-polyisoprene and about 80–30% by weight of the EPDM rubber. Better results are often obtained when the blend contains 20–50% by weight of the natural rubber or cis-1,4-polyisoprene, and 80–50% by weight of the EPDM rubber. Natural rubber is usually preferred in preparing blends to be used as a tackifying agent. Such blends are especially effective when dissolved in an organic hydrocarbon solvent or chlorinated hydrocarbon solvent for rubber, and when the resulting cement is used as a tackifying agent or a coating agent in the manufacture of pneumatic tires. The solvent may be any suitable non-viscous solvent for rubber, including hydrocarbons containing, for example, 5–10 carbon atoms and halogenated hydrocarbons containing 1–8 carbon atoms. The polymerization solvent described hereinafter for use in preparing the EPDM rubber is satisfactory and may be used. The various blends described above also may be used in their solid state as an adhesive agent.

Representative examples of the highly unsaturated hydrocarbon rubbers for use in preparing the blends include natural rubber, butadiene-styrene rubbers (SBR) and especially those containing less than 50% by weight of bound styrene, isoprene rubber (IR), butadiene rubber (BR), and styrene-isoprene rubber (SIR). The preferred IR and BR rubbers are cis-1,4-polybutadiene and cis-1,4-polyisoprene, respectively, having a cis-1,4-addition of at least 90%. SBR is preferred for many commercial applications, such as in the manufacture of pneumatic tires.

The preparation and properties of the foregoing rubbers are well known and are described in a large number of issued United States patents and other publications, including the following: Introduction to Rubber Technology, edited by M. Morton, Reinhold Publishing Corporation, New York (1959); Synthetic Rubber Technology, vol. I, by W. S. Penn, Maclaren and Sons, Ltd., London (1960); Rubber, Fundamentals of Its Science and Technology, J. LeBras, Chemical Publishing Company, Inc., New York (1957); and Linear and Stereoregular Addition Polymers, N. G. Gaylord et al., Innerscience Publishers, New York (1959). Typical commercially available elastomers of the foregoing types are described in the text "Compounding Ingredients For Rubbers, 3rd Edition, Cuneo Press of New England, Cambridge, Mass." The above publications are incorporated herein by reference.

The EPDM elastomers used in preparing the blends of the invention are the products resulting from interpolymerizing a monomeric mixture containing ethylene, at least one other straight chain alpha monoolefin containing 3–16 carbon atoms, and a polyunsaturated bridged-ring hydrocarbon having at least one carbon-to-carbon double bond in a bridged ring, in solution in an organic polymerization solvent and in the presence of a Ziegler catalyst. In general, the basic reaction conditions may be the same as those employed in the prior art for preparing EPDM rubbers, except that a much larger amount of the bridged ring compound is reacted to thereby produce a highly unsaturated EPDM rubber.

It is preferred that the EPDM elastomers for the blends be prepared from a monomeric mixture containing ethylene, propylene and the polyunsaturated bridged-ring hydrocarbon, in proportions to produce a polymer having good elastomeric properties and an unsaturation level of at least 7 carbon-to-carbon double bonds per thousand carbon atoms in the polymer. For example, the elastomer may contain chemically bound therein molar ratios of ethylene to propylene varying between about 80:20 and 20:80. The bridged-ring hydrocarbon may be chemically bound therein in an amount to provide an unsaturation level of 7–25, and preferably about 10–20 or 10–15 carbon-to-carbon double bonds per thousand carbon atoms in the polymer. The specific unsaturation level that is selected in a given instance will depend upon the desired rate of cure or other property, but usually an EPDM rubber having about 10–25 carbon-to-carbon double bonds per 1000 carbon atoms is more compatible with the highly unsaturated hydrocarbon rubbers.

In instances where it is desired to prepare a tetrapolymer, or a polymer from more than five different monomers, then one or more alpha monoolefins containing 4–16 carbon atoms may be substituted for an equal molar quantity of bound propylene in the above-mentioned monomer compositions. When preparing tetrapolymers, the range of the fourth monomer will normally be about 5–20 mol percent.

Examples of the bridged-ring hydrocarbons include the polyunsaturated derivatives of bicyclo(2,2,1)heptane wherein at least one double bond is present in one of the bridged rings, such as dicyclopentadiene, bicyclo (2,2,1) hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 2–20 carbon atoms and preferably 2–10 carbon atoms. Other bridged-ring hydrocarbons include polyunsaturated derivatives of bicyclo(2,2,2)-octane as represented by bicyclo(2,2,2)octa-2,5-diene, polyunsaturated derivatives of bicyclo (3,2,1)octane, polyunsaturated derivatives of bicyclo(3,3,1)nonane, and polyunsaturated derivatives of bicyclo(3,2,2)nonane. At least one double bond is present in a bridged ring of the above compounds, and at least one other double bond is present in a bridged ring or in a side chain. Further examples of polyunsaturated bridged-ring hydrocarbons and their use in the preparation of prior art EPDM rubber are found in U.S. Patent Nos. 2,933,480, 3,093,620, 3,093,621 and 3,211,709, the disclosures of which are incorporated herein by reference.

The EPDM elastomers which are especially preferred in preparing the blends of the invention include polymers which contain chemically bound therein molar ratios of ethylene to propylene varying between 70:30 and 55:45. Specific examples of polyolefins which may be used include 5-methylene-2-norbornene, 5-ethylidene-2-norbornene, dicyclopentadiene, the methyl butenyl norbornenes such as 5-(2-methyl-2-butenyl)-2-norbornene or 5-(3-methyl-2-butenyl) norbornene, and 5-(3,5-dimethyl-4-hexenyl)-2-norbornene. The elastomer prepared from 5-ethylidene-2-norbornene is much preferred as it has outstanding properties and produces many unusual and unexpected results. As a result, this elastomer is in a class by itself.

The polymerization solvent may be any suitable inert or saturated hydrocarbon which is liquid and relatively non-viscous under the reaction conditions, including the prior art solvents for the solution polymerization of monoolefins in the presence of a Ziegler catalyst. Examples of satisfactory hydrocarbon solvents include open chain saturated hydrocarbons containing 5–8 carbon atoms, of which hexane is usually preferred; aromatic hydrocarbons and especially those containing a single benzene nucleus such as benzene or toluene; and saturated cyclic hydrocarbons which have boiling ranges approximating those for the open chain and aromatic hydrocarbons discussed above, and especially saturated cyclic hydrocarbons containing 5 or 6 carbon atoms in the ring. The solvent may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the Ziegler catalyst.

Ziegler catalysts in accordance with the prior art may be used in preparing the EPDM elastomer. In general, any suitable prior art Zeigler-type catalyst may be used which is known to produce a satisfactory elastomer. Ziegler catalysts are disclosed in a large number of issued patents, such as U.S. Patent Nos. 2,933,480, 3,093,620, 3,093,621, 3,211,709 and 3,113,115. Examples of Ziegler catalysts include metal organic coordination catalysts prepared by contacting a compound of a metal of Group IVa, Va, VIa or VIIa of the Mendeleeff periodic chart of the elements, as typified by titanium, vanadium and chrominum halides, with an organometallic compound of a metal of Group I, II or III of the Mendeleeff periodic chart which contains at least one carbon-metal bond, as typified by trialkyl aluminum and alkyl aluminum halides wherein the alkyl groups contain 1–20 and preferably 1–4 carbon atoms.

The preferred Ziegler catalyst for many polymerizations is prepared from a vanadium compound and an alkyl aluminum halide. Examples of suitable vanadium compounds include vanadium trichloride, vanadium tetrachloride, vanadium oxychloride, vanadium acetylacetonate, etc. Activators which are especially preferred include alkyl aluminum chlorides of the general formulae $R_1AlCl_2$ and $R_2AlCl$, and the corresponding sesquichlorides of the general formula $R_3Al_2Cl_3$, wherein R is a methyl, ethyl, propyl, butyl or isobutyl radical. A catalyst prepared from methyl or ethyl aluminum sesquichloride and vanadium oxychloride is especially preferred, and when using this catalyst, the optimum ratio of the catalyst components is usually 1 mol of vanadium oxychloride for each 12–20 mols of the alkyl aluminum sesquichloride.

The blend may be cured following prior art procedures, and special curing techniques are not necessary. As a general rule, curing procedure which is normally followed in curing the highly unsaturated hydrocarbon rubber component is also satisfactory in curing the blend. Various curing procedures, including the materials and the quantities thereof to be employed, are described in a large number of publications which are well known in the art. These publications include those previously mentioned. Additional publications include Principals of High Polymer Theory and Practice, Schmidt et al., McGraw-Hill Book Company, New York (1948); Chemistry and Technology of Rubber, Davis et al., Reinhold Publishing Corporation, New York (1937); The Applied Science of Rubber, edited by W. J. S. Naunton, published by Edward Arnold, Ltd., London (1961), and the encyclopedia of Chemical Technology, Kirk and Othmer, published by Innerscience Encyclopedia, Inc., New York (1953).

As is taught by the above-mentioned texts, the blends of the present invention may be vulcanized with vulcanizing agents including, for example, sulfur or sulfur bearing compounds which provide sulfur under the vulcanizing conditions. Sulfur is the preferred vulcanizing agent, and it is usually used in a amount of about 0.5–3, and preferably about 1–2, parts by weight per hundred parts by weight of rubber in the blend. Zinc oxide and other metal oxides may be used in an amount of, for example, about 2–10 parts by weight per 100 parts by weight of rubber (phr.). Vulcanization accelerators such as tetramethylthiuram monosulfide, tetramethylthiuram disulfide, the zinc salt of dimethyl dithiocarbamic acid, the piperidine salt of pentamethyl dithiocarbamic acid, N,N-diethylthiocarbamyl-2-mercaptobenzothiazole and 2-mercaptozoline may be used.

Conventional fillers and pigments may be added, such as about 10–100 phr. of carbon black, finely divided silica, esterified silica, titanium dioxide, kaolin, and whiting. It is also possible to oil extend the blends. Napthenic oils for use in processing or extending rubbery polymers are preferred, and are usually added in an amount of about 10–100 phr. and preferably about 20–80 phr. Other types of oil may be used, such as the aromatic, highly aromatic and paraffinic oils.

Vulcanization is accomplished by heating the compounded blend described above at a vulcanizing temperature and for a period of time sufficient for the vulcanization reaction to occur. A temperature of about 130–160° C. for about 10–90 minutes, and preferably about 160° C. for about 30 minutes, is often satisfactory. The specific time and temperature that are selected in a given instance will depend upon the nature of the vulcanizing agent, accelerator, and other ingredients which are present. The vulcanized blends are especially useful for specialized applications, such as in environments where a combination of ozone resistance and high physical properties are essential.

In accordance with another important variant of the invention, it has been discovered unexpectedly that when the blends contain about 20–70 parts by weight of the highly unsaturated hydrocarbon rubber, and 80–30 parts by weight of the EPDM rubber, then the blends may be used as adhesives in the preparation of rubbery polymer laminates from laminae prepared from highly unsaturated hydrocarbon rubber and low unsaturation EPDM containing less than 5 carbon-to-carbon double bonds per 1000 carbon atoms which is normally incompatible therewith. When using the blend as a laminating adhesive, it is only necessary that it be disposed between the surface areas of the laminae to be joined, and then the resulting assembly is subjected to the usual heat and pressure normally employed in effecting the vulcanization. For example, the blend may be applied to the surface of one lamina in the form of a thin sheet, or in the form of a solution in an organic solvent. Thereafter, the second lamina is applied thereover and the assembly is compressed and vulcanized. The resulting bond between the laminae is very strong due to convulcanization and the laminae do not separate under stress and strain, as is true of the prior art laminates.

It is also possible to use the highly unsaturated EPDM rubber containing 7–25 double bonds per 1000 carbon atoms by itself as an adhesive between superimposed laminae of the two incompatible rubbers in the same manner as described above for the blend.

Inasmuch as the highly unsaturatd EPDM rubber is completely compatible with both the highly unsaturated hydrocarbon rubber and the low unsaturation EPDM rubber, a strong bond is formed due to covulcanization with each lamina.

In instances, where a blend is prepared from 20–70, preferably about 20–50, parts by weight of natural rubber or cis-1,4-polyisoprene, and 80–30, preferably 80–50, parts by weight of the highly unsaturated EPDM, the resulting blend may be dissolved in a hydrocarbon solvent or halogenated hydrocarbon solvent and used as a tackifying agent in preparing the laminates. For instance, it is possible to apply a solution of the blend to one or both of the surface areas of the laminae to be joined, and then press one surface upon the other. There is sufficient tackiness or adhesive action imparted to the normally non-tacky surfaces to cause the laminae to stick together with a sufficiently strong bond to allow the uncured laminate to be constructed and handled readily. At the same time, a coating of the rubber blend is provided at the bond which is compatible with both laminae and which assures covulcanization at the bond. This tackirying action, in combination with the ability to render compatible the surfaces of normally incompatible laminae, is very desirable for some purposes, such as in the manufacture of pneumatic tires. Heretofore, the lack of tact in EPDM rubber containing less than 7 carbon-to-carbon double bonds per 1000 carbon atoms, and its complete incompatibility with the highly unsaturated hydrocarbon rubbers, have been serious drawbacks in the manufacture of pneumatic tires. However, this problem has been solved by the present invention, as it is possible to simultaneously overcome both of the problems.

Upon reference to the drawings, FIGURE 1 illustrates a pneumatic tubeless tire, the carcass, tread and sidewalls of which may be manufactured from EPDM rubber above, or a combination of EPDM rubber with highly unsaturated hydrocarbon rubbers when following the principles of the present invention. The tire 10 has a cross-section in the form of a generally hollow toroidal member. The terminal portions thereof constitute the bead portion 11—11 of the tire 10, inside of which a plurality of reinforcements 9 are embedded and molded into the rubber. The outer surface of the bead portion 11 is formed of an air sealing layer such as butyl rubber to aid in adhesion to the rim 12 when the tire is inflated and to prevent the leakage of air. Usually the inner liner 16 is formed of a butyl rubber or halogenated butyl rubber and it may be pre-vulcanized. The outer surface of the tire includes tread portion 13 and sidewalls 14. The carcass 15 is located in the space between the inner liner 16, the tread 13 and sidewall 14 and it is formed from four reinforced rubber layers or plies 17. As is illustrated in detail in FIGURE 2, the plies 17 have reinforcements such as tire cords 19 embedded within the matrix rubber 20.

In the manufacture of the tire illustrated in FIGURE 1, it is the usual practice to place the inner liner 16 on a tire building drum, superimpose successively each of the four plies 17 thereon to thereby form the carcass 15, then apply the sidewall portion 14 and the tread 13 on the resulting assembly, and finally place the completed assembly in a tire mold for vulcanizing. Thus, the construction of a tire includes the assembly and bonding together of a plurality of laminae into the final laminated pneumatic tire product. Inasmuch as the ply, sidewall and tread members used initially in constructing the assembly are formed from compounded uncured rubber, it is apparent that the uncured laminae must be handled and retained in place prior to curing. Therefore the various laminae must be sufficiently tacky so as to form a green or temporary bond strong enough to assure retention in the assembled positions and to prevent dislodging prior to and during the curing step. Also, the rubber in each of the laminae must be compatible and capable of co-curing with the immediately adjacent laminae. Otherwise, a strong bond is not formed and the various laminae will separate under strenuous conditions of use.

The above-mentioned requirements for a tire building operation have made it impractical to prepare tires from EPDM rubber stocks, either alone or in combination with the highly unsaturated rubbers. Inasmuch as EPDM rubber lacks natural tact, the various plies and the tread could not be assembled and retained conveniently on the drum in the tire building step. When an effort was made to improve the surface tack by applying a tackifying agent such as natural rubber cement to the surfaces to be joined, the EPDM rubber and the natural rubber were found to be incompatible and a very weak bond was formed. The plies and tread separated during use and the tire failed.

Tire treads or plies formed from the blend of the invention and/or the highly unsaturated EPDM rubber used in preparing the blends, are compatible with the highly unsaturated hydrocarbon rubbers. Thus, when there is a lack of tack, the surface may be tackified by applying a coating of natural rubber or synthetic cis-1,4-polyisoprene cement, or by using an adherent thin layer or extrusion thereof on the surface to be bonded. The tire tread and/or the plies may be supplied as a pre-coated or pretackified article when this is desired. When natural rubber or synthetic cis-1,4-polyisoprene is used in preparing the blend, then the treads and plies formed therefrom have adequate tack and the problems of incompatibility and lack of tack are solved simultaneously.

It is possible to use the blend of the present invention and/or the highly unsaturated EPDM used in preparing the blend, to coat the surface areas of the laminae to be bonded and to thereby make the various laminae compatible during the curing step. In instances where natural rubber or synthetic cis-1,4-polyisoprene is used in preparing the blend, then the blend also has a tackifying action, and the coated laminae surfaces form a temporary bond having sufficient strength in the uncured state. When such a tackifying blend is not used, tack may be supplied by coating with natural rubber cement. When this procedure, the surfaces of the various lamina may be made compatible and tacky regardless of their internal compositions, and a strong bond is formed as the surfaces co-cure during the vulcanization step. The coated laminae described above likewise may be prepared prior to use and supplied as the coated article. By way of example, it is possible to use a hologenated butyl rubber liner, carcass plies composed of SBR and/or EPDM rubber containing less than 7 double bonds per 1000 carbon atoms, and a SBR and/or EPDM rubber tread. It is also possible to have the tread and plies constructed entirely from the blend of the invention and/or from the highly unsaturated EPDM rubber used in preparing the blend.

The EPDM rubber described herein containing less than 7, and preferably less than 5, double bonds per 1000 carbon atoms is a prior art rubber which may be prepared by any convenient process. including those mentioned herein. The polyolefin monomers may be those mentioned herein, or straight or branched chain, or cyclic polymers, such as those containing 4–20 and preferably 4–8 carbon atoms and two double bonds.

The foregoing detailed description, the drawings, and the following specific examples are for purposes of illustration only, and are not intended as being limiting to the spirit or scope of the appended claims.

EXAMPLE I

This example illustrates the preparation of a highly unsaturated ethylene - propylene - 5 - ethylidene - 2 - norbornene terpolymer for use in preparing the blends of the invention.

The reaction vessel was a one-half gallon Sutherland reactor equipped with a high speed, heavy-duty, air driven motor, cooling coils, a thermometer, a temperature regulator, a pressure regulator, an injection port, and other openings where monomers, catalyst, and solvent were fed to the reactor. A tube dipping to the bottom of the reactor was present for the removal of the cement, which was produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes, the temperature was lowered to ambient, and one liter of Esso chemical grade hexane (dried over 4A molecular sieves and stored over sodium) was added to the reactor. As the temperature was brought to 30° C., propylene was fed to the reactor through a 4A molecular sieve column until 42.2 inches of mercury pressure was reached. The pressure was then brought up to 61 inches of mercury with ethylene fed through a 4A molecular sieve column and 11.9 millimoles (1.63 cc.) of pure 5-ethylidene-2-norbornene and 1.3 cc. of 1.5 molar ethylaluminum sesquichloride were added.

The monomers were shut off and the catalyst components, i.e., 0.525 molar ethylaluminum sesquichloride and 0.0543 molar vanadium oxytrichloride at a 12 to 1 aluminum to vanadium ratio, were fed into the reactor at a constant rate until a drop in the pressure in the reactor was noted. At this time the gaseous monomers were fed into the reactor through suitably calibrated rotometers at a rate of 1542 cc./minute, of which 696 cc. were ethylene and 846 cc. were propylene. The 5-ethylidene-2-norbornene was added as a 0.30 molar solution in hexane, which was also 0.009 molar in pyridine, at the rate of 3.53 cc./minute to thereby provide about 8.6 weight percent of the third monomer to be incorporated into the polymer. The polymerization was controlled by the catalyst pumps which added catalyst on demand as the pressure increased, thereby maintaining the 61 inches of mercury pressure throughout the run. When the solution became approximately 6% polymer, solvent containing 16 cc. of dissolved ethylene per cc. of solvent was fed at the rate of 26.5 cc./minute into the reactor and the polymer cement was taken off at the rate of about 90.4 g. of polymer per hour.

At this time the ethylene and propylene feeds were adjusted to 345 cc./minute and 1843 cc./minute to compensate for the unreacted monomers removed with the cement and the third monomer feed rate was adjusted to 4.9 cc./minute.

The solution cement as removed from the reactor was fed into a Waring Blendor containing water where it was intimately mixed, and then it was washed three times with equal volumes of water. The washed cement was stabilized and pre-extended with 20 parts by weight of naphthenic oil for each 100 parts by weight of rubber, and fed under nitrogen pressure into a T joint at the bottom of a 4-liter vessel filled with hot circulating water. The other end of the T was connected to a steam line and steam was admitted at a rate sufficient to superheat the rubber cement. The solvent and unreacted monomers were mostly removed by this procedure. The rubber crumb was collected on a screen, washed, and chopped up in a Waring Blendor. The rubber crumb was dried in an oven at 90° C. to remove any remaining solvent and water.

The resulting rubbery copolymer contained 62 mole percent of chemically bound ethylene by infrared analysis, using the 720 cm.$^{-1}$ absorbance for ethylene and the 968 cm.$^{-1}$ absorbance for propylene, and had a reduced specific viscosity in Decalin (0.1% at 135° C.) of 2.96. The unsaturation expressed in C=C/1000 carbon atoms was 14.5. The polymer was analyzed for unsaturation by the consumption of bromine correcting for the substitution reaction by a differential kinetic method based on the spectrophotometric method developed by Siggia et al., Anal. Chem. 35, 362 (1963).

The dried terpolymer was compounded in a Brabender plasticorder in accordance with the formulations B, C and D appearing in Table I. Formulation A was a control. Formulations E, F and G were made with an ethylene-propylene-5-ethylidene-2-norbornene terpolymer having a double bond content of 4.7 per 1000 carbon atoms to provide comparative data for low unsaturated EPDM.

TABLE I.—BLENDS OF ETHYLENE/PROPYLENE TERPOLYMERS WITH SBR IN A TIRE TREAD FORMULATION

| Ingredient | A | B | C | D | E | F | G |
|---|---|---|---|---|---|---|---|
| SBR 1814 [1] | 89.9 | 89.9 | 89.9 | 89.9 | 89.9 | 89.9 | 89.9 |
| SBR 1830 [2] | 24.00 | 24.00 | 24.00 | 24.00 | 24.00 | 24.00 | 24.00 |
| SBR 1712 [3] | 29.1 | 14.1 | 9.1 | 4.1 | 14.1 | 9.1 | 4.1 |
| Terpolymer of Example I, 14 C=C/1,000 C | | 15.00 | 20.00 | 25.00 | | | |
| Terpolymer of Example I, 4.7 C=C/1,000 C | | | | | 15.00 | 20.00 | 25.00 |
| ISAF [4] | 9.03 | 9.03 | 9.03 | 9.03 | 9.03 | 9.03 | 9.03 |
| Zinc oxide | 2.20 | 2.20 | 2.20 | 2.20 | 2.20 | 2.20 | 2.20 |
| Stearic acid | 1.50 | 1.50 | 1.50 | 1.50 | 1.50 | 1.50 | 1.50 |
| Flexamine G [5] | 0.35 | 0.35 | 0.35 | 0.35 | 0.35 | 0.35 | 0.35 |
| NOBS special [6] | 0.80 | 0.80 | 0.80 | 0.80 | 0.80 | 0.80 | 0.80 |
| Diphenylguanidine | 0.45 | 0.45 | 0.45 | 0.45 | 0.45 | 0.45 | 0.45 |
| Sulfur | 1.15 | 1.15 | 1.15 | 1.15 | 1.15 | 1.15 | 1.15 |
| Compound ML-4 | 42 | 49 | 52 | 55 | 49 | 51 | 52 |
| Scorch MS, mins. to 3 pt. rise at 275° F | 24.7 | 22.4 | 21.8 | 22.7 | 23.1 | 22.0 | 21.5 |

[1] SBR 1814—Oil extended, intermediate super abrasion carbon black masterbatch with the following composition: 100 parts mixed rosin and fatty acid emulsified styrene-butadiene rubber; 75 parts intermediate super abrasion carbon black; 50 parts highly aromatic oil, staining stabilizer.
[2] SBR 1830—Non-staining oil extended, semi-reinforcing black masterbatch with the following composition: 100 parts mixed rosin and fatty acid emulsified styrene-butadiene rubber; 68.75 parts semi-reinforcing carbon black; 37.50 parts naphthenic oil, non-staining stabilizer.
[3] SBR 1712—Mixed rosin and fatty acid emulsified styrene-butadiene rubber extended with 37.5 parts of highly aromatic oil stabilized with a staining antioxidant.
[4] ISAF—Intermediate super abrasion furnace black.
[5] Flexamine G—65% complex diarylamine-ketone reaction product and 35% commercial n-n'-diphenyl-p phenylenediamine.
[6] NOBS Special—N-oxydiethylene benzothiazole-2-sulfenamide.

The formulations A–G of Table I were vulcanized, and then tested following prior art procedures, as follows:

(1) The tensile, 300% modulus and elongation were determined using ASTM, Method D412–62T.

(2) The hardness was determined with a Shore A Durometer.

(3) The compression set was run by ASTM D–395–61, Method B, 22 hours at 212° F.

(4) The Goodrich ΔT was run on a Goodrich Flexometer for 25 minutes at 100° F., 0.175 inch stroke, 1800 cycles per minute, with 143 p.s.i. load on the sample. Sample was 0.7 inch in diameter and 1.0 inch high.

(5) The ozone resistance tests were run in a Model 0300 Orec cabinet at 50 parts per hundred million ozone for 70 hours at 100° F. Loop test specimens as described in ASTM D–518–61 were used.

(6) The Monsanto Rheometer tests were run at 320° F., 900 cycles per minute and at 3° oscillation.

The data thus obtained are recorded below in Table II.

TABLE II

| Physical property | Cure at 320° F. (min.) | A | B | C | D | E | F | G |
|---|---|---|---|---|---|---|---|---|
| Tensile, p.s.i. | 10 | 3,050 | 3,025 | 3,250 | 3,250 | 2,325 | 2,400 | 6,075 |
|  | 25 | 3,325 | 3,375 | 3,375 | 3,375 | 2,400 | 2,300 | 2,200 |
| Percent elongation | 10 | 780 | 760 | 690 | 680 | 650 | 590 | 520 |
|  | 25 | 760 | 680 | 650 | 650 | 590 | 570 | 520 |
| 300% modulus, p.s.i. | 10 | 600 | 700 | 1,000 | 900 | 675 | 950 | 1,050 |
|  | 25 | 775 | 975 | 1,100 | 1,075 | 875 | 975 | 1,100 |
| Hardness, Shore A | 10 | 50 | 54 | 55 | 55 | 53 | 57 | 57 |
|  | 25 | 50 | 55 | 55 | 55 | 55 | 57 | 58 |
| Comp. Set, 22 Hrs. at 100° C., percent | 25 | 36.7 | 32.8 | 31.8 | 29.7 | 34.2 | 35.6 | 33.9 |
| Goodrich ΔT,° F | 25 | 83 | 76 | 76 | 75 | 91 | 104 | 96 |
| Ozone Resistance, 70 hrs., 50 pphr. at 500° F: |  |  |  |  |  |  |  |  |
| Static | | V. poor | Exc. | Exc. | Exc. | Exc. | Exc. | Exc. | Exc. |
| Dynamic | | V. poor | Exc. | Exc. | Exc. | Exc. | Exc. | Exc. | Exc. |

EXAMPLE II

This example illustrates the preparation and testing of an ethylene-propylene-5-ethylidene-2-norbornene terpolymer having a double bond content of 10 per 1000 carbon atoms.

The terpoylmer was prepared in accordance with the general procedure of Example I, with the exception of reducing the feed rate of 5-ethylidene-2-norbornene to provide an unsaturation level of 10 double bonds per 1000 carbon atoms.

The dried terpolymer having an unsaturation level of 10 double bonds per 1000 carbon atoms was compounded as in Example I in accordance with the formulations B, C and D of Table III. Formulation A was a control, Formulations E, F and G were made with a commercial ethylene-propylene-hexadiene terpolymer having an unsaturation level of 4–4.2 double bonds per 1000 carbon atoms to provide comparative data.

EXAMPLE III

This example illustrates the preparation of a pneumatic tire from EPDM rubber using the principles of the invention.

A total of four tire cord reinforced rubber plies are prepared from a matrix rubber compounded from, on a weight basis, 60 parts of an ethylene-propylene-5-ethylidene-2-norbornene terpolymer having an unsaturation of 15 carbon-to-carbon double bonds per 1000 carbon atoms, 40 parts of natural rubber, 75 parts of semi-reinforcing carbon black, 17 parts of naphthenic oil, 5 parts of zinc oxide, 1 part of stearic acid, 0.8 part of N-oxydiethylene benzothiazole-2-sulfenamide, 0.4 part of diphenylguanidine, and 1.2 parts of sulfur. The formulation is thoroughly mixed in conventional Banbury-type mixing equipment. Each of the four plies is formed by calendering the compounded rubber composition onto wefted nylon tire cord which has been rubberized by dipping TABLE III.—BLENDS OF ETHYLENE/PROPYLENE TERPOLYMERS WITH SBR IN A TIRE TREAD FORMULATION

| Ingredient | | | | | | | |
|---|---|---|---|---|---|---|---|
| SBR 1814 | 89.90 | 89.90 | 89.90 | 89.90 | 89.90 | 89.90 | 89.90 |
| SBR 1830 | 24.00 | 24.00 | 24.00 | 24.00 | 24.00 | 24.00 | 64.00 |
| SBR 1712 | 29.10 | 19.10 | 9.10 | | 19.10 | 9.10 | |
| Terpolymer of Example II | | 10.00 | 20.00 | 30.00 | | | |
| Control terpolymer* | | | | | 10.00 | 20.00 | 30.00 |
| ISAF | 9.03 | 9.03 | 9.03 | 9.03 | 9.03 | 9.03 | 9.03 |
| Zinc oxide | 2.20 | 2.20 | 2.20 | 2.20 | 2.20 | 2.20 | 2.20 |
| Stearic acid | 1.50 | 5.50 | 1.50 | 1.50 | 1.50 | 1.50 | 1.50 |
| Flexamine G | 0.35 | 0.35 | 0.35 | 0.35 | 0.35 | 0.35 | 0.35 |
| NOBS special | 0.80 | 0.80 | 0.80 | 0.80 | 0.80 | 0.80 | 0.80 |
| Diphenylguanidine | 0.45 | 0.45 | 0.45 | 0.45 | 0.45 | 0.45 | 0.45 |
| Sulfur | 1.15 | 1.15 | 1.15 | 1.55 | 1.15 | 1.15 | 1.15 |
| Compound ML-4 | 35 | 37 | 42 | 47 | 40 | 49 | 55 |

*Ethylene-propylene-hexadiene terpolymer, 4–4.2 C=C/1000C.

The formulations A–G of Table III were vulcanized, and then tested following the same procedures as in Example I. The data thus obtained are recorded below in Table IV.

into a prior art rescorcinol-formaldehyde vinyl pyridine latex, followed by drying. The plies are cut to the length necessary for manufacturing the tire.

A pneumatic tire is constructed from the plies formed

TABLE IV

| Physical property | Time of Cure at 320° F. (min.) | A | B | C | D | E | F | G |
|---|---|---|---|---|---|---|---|---|
| Tensile, p.s.i. | 10 | 2,550 | 2,500 | 2,200 | 2,300 | 2,225 | 1,675 | 1,000 |
|  | 25 | 2,550 | 6,700 | 2,850 | 2,325 | 2,220 | 1,700 | 1,300 |
| Percent Elongation | 10 | 720 | 580 | 580 | 570 | 650 | 490 | 330 |
|  | 25 | 650 | 650 | 540 | 520 | 580 | 470 | 380 |
| 300% modulus, p.s.i. | 10 | 700 | 750 | 925 | 1,025 | 750 | 950 | 900 |
|  | 25 | 800 | 900 | 1,025 | 1,150 | 875 | 975 | 1,000 |
| Hardness, Shore A | 10 | 53 | 55 | 60 | 60 | 55 | 60 | 60 |
|  | 25 | 55 | 55 | 60 | 60 | 55 | 60 | 60 |
| Compression Set, 22 hrs. at 100° C., percent | 25 | 31.4 | 28.2 | 27.9 | 26.5 | 27.8 | 30.2 | 36.5 |
| Goodrich ΔT, ° F | 25 | 78 | 74 | 74 | 72 | 88 | 105 | (*) |
| Ozone resistance, 70 hrs., 50 pphm. at 100° F: |  |  |  |  |  |  |  |  |
| Static | | V. poor | Poor | Exc. | Exc. | Fair | Exc. | Exc. |
| Dynamic | | V. poor | Poor | Exc. | Exc. | Exc. | Exc. | Exc. |

* Flattened and fell out of machine.

above, annular bead reinforcements, an inner liner, a tire tread and sidewall extrusion, following prior tire building practices similar to that discussed previously in connection with the drawing. An inner liner composed of chlorobutyl rubber is laid upon a tire building drum. Then, the first of the four cord reinforced rubber plies is superimposed upon the inner liner, the ends thereof are fastened around the bead reinforcement, and the remaining three plies are superimposed thereupon to form the carcass. Finally, a specially coated tire tread composed of an ethylene-propylene-5-ethylidene-2-norbornene terpolymer having an unsaturation level of 3.5 carbon-to-carbon double bonds per 1000 carbon atoms is superimposed on top of the carcass. The surface of the tire tread which is contacted by the carcass has a special tackifying layer thereon of the same blend which is used in preparing the plies for the carcass.

The tire tread is prepared from a compounded stock containing the 3.5 C=C/1000 C. low unsaturated EPDM rubber above mentioned in an amount of 100 parts by weight, and in combination therewith on a weight basis 80 parts intermediate super abrasion carbon black, 55 parts of naphthenic oil, 5 parts of zinc oxide, 1 part of stearic acid, 1.5 parts tetramethylthiuram monosulfide, and 0.75 part by weight of 2-mercaptobenzothiazole, and 1.5 parts of sulfur. The ingredients comprising the tire tread formulation are mixed in a Banbury mixer in accordance with conventional practice, and then the tire tread is extruded through a die likewise following conventional practice. At the time of extruding the tire tread, a compatible, tackifying layer of the blend used in preparing the plies is applied in the form of a cement, which in a solution of the blend in hexane. The cement is applied in an amount sufficient to form a thin, but continuous layer over the surface of the tire tread which normally contacts the carcass.

The assembly is stitched down, and then placed in a prior art mold for vulcanizing the tire. The assembly is cured in a mold at 320° F. for 20 minutes. The resulting tubeless tire is as illustrated in FIGURE 1 of the drawings, and includes a carcass which has a plurality of plies tightly adhering each to the other, with the inner ply tightly adhering to the butyl innerliner and outer ply tightly adhering to the tire tread. Upon testing, the tire carcass is found to be very strong. There is no tendency for the plies to separate, nor for the tread to separate from the carcass. The rubber is found to adhere tenaciously throughout the various laminae.

What is claimed is:

1. A sulfur vulcanizable blend of rubbery polymers comprising about 5-95 parts by weight of a rubbery hydrocarbon polymer selected from the group consisting of natural rubber, styrene-butadiene rubber, polybutadiene rubber, polyisoprene rubber and mixtures thereof, and 95-5 parts by weight of a rubbery interpolymer which is the product of the interpolymerization of ethylene, at least one straight chain monoolefin containing 3-16 carbon atoms and an alkylidene norbornene having from 2 20 carbon atoms in the alkylidene group, the rubbery interpolymer having a mol ratio of chemically bound ethylene to the monoolefin containing 3-16 carbon atoms between 80:20 and 20:80 and containing 7-25 carbon-to-carbon double bonds per 1000 carbon atoms.

2. The blend of claim 1 wherein the said rubbery interpolymer is present in an amount of about 15-30 parts by weight for each 85-70 parts by weight of the rubbery hydrocarbon polymer.

3. The blend of claim 1 wherein the rubbery hydrocarbon polymer is present in an amount of about 20-70 parts by weight for each 80-30 parts by weight of the rubbery interpolymer.

4. The blend of claim 1 wherein the hydrocarbon polymer is styrene-butadiene rubber.

5. The blend of claim 1 wherein the hydrocarbon polymer is styrene-butadiene rubber and the said interpolymer is present in an amount of about 15-30 parts by weight for each 85-70 parts by weight of the styrene-butadiene rubber.

6. The blend of claim 1 wherein the said rubbery interpolymer is the product of the interpolymerization of ethylene, propylene and 5-ethylidene-2-norbornene.

7. The blend of claim 6 wherein the said rubbery interpolymer contains about 10-20 carbon-to-carbon double bonds per 1000 carbon atoms.

8. The blend of claim 6 wherein the hydrocarbon polymer is styrene-butadiene rubber and the said rubbery interpolymer is present in an amount of about 15-30 parts by weight for each 85-70 parts by weight of the styrene-butadiene rubber.

9. The blend of claim 6 wherein the hydrocarbon polymer is selected from the group consisting of natural rubber and cis-1,4-polyisoprene and the hydrocarbon polymer is present in an amount of about 20-50 parts by weight for each 80-50 parts by weight of the hydrocarbon polymer.

10. The vulcanizate obtained by vulcanizing the blend of claim 1 with sulfur.

11. The vulcanizate of claim 10 wherein the said rubbery interpolymer is present in an amount of about 15-30 parts by weight for each 85-70 parts by weight of the rubbery hydrocarbon polymer.

12. The vulcanizate of claim 11 wherein the hydrocarbon polymer is styrene-butadiene rubber.

13. The vulcanizate of claim 10 wherein the said rubbery interpolymer is the product of the interpolymerization of ethylene, propylene, and 5-ethylidene-2-norbornene.

14. The vulcanizate of claim 13 wherein the hydrocarbon polymer is styrene-butadiene rubber and the said rubbery interpolymer is present in an amount of about 15-30 parts by weight for each 85-70 parts by weight of the rubbery hydrocarbon polymer.

15. The vulcanizate of claim 10 wherein the said rubbery hydrocarbon polymer is present in an amount of about 20-70 parts by weight for each 80-30 parts by weight of the rubbery interpolymer.

References Cited

UNITED STATES PATENTS

| | | | |
|---|---|---|---|
| 3,093,620 | 6/1963 | Gladding et al. | 260—80.78 |
| 3,224,985 | 12/1965 | Gladding et al. | 260—5 |
| 3,343,582 | 9/1967 | Himes et al. | 260—889 |
| 3,356,764 | 12/1967 | Gentile | 260—889 |

MURRAY TILLMAN, Primary Examiner

M. J. TULLY, Assistant Examiner

U.S. Cl. X.R.

152—330; 156—128, 334, 338; 161—240, 243, 253; 260—5, 33.6, 33.8, 41.5, 79.5, 80.78

UNITED STATES PATENT OFFICE

CERTIFICATE OF CORRECTION

Patent No. 3,492,370              Dated January 27, 1970

Kenneth H. Wirth

It is certified that error appears in the above-identified patent and that said Letters Patent are hereby corrected as shown below:

Col. 8, line 20, before "this" insert -- following ---;

Col. 11, Table II, col. D, first line, change the numeral "3250" to -- 3150 --; same table, col. G, first line, cancel "6075" and substitute -- 2075 --; same table, under Ozone Resistance, cancel "500° F." and substitute --- 100° F. --;

Col. 11, Table III, last column, second line, cancel "64.00" and substitute -- 24.00 --; same Table, in the line headed Stearic acid, second column, cancel "5.50" and substitute -- 1.50 --;

Col. 11, Table IV, line 2 under col. B, cancel "6700" and substitute -- 2700 --;

Col. 13, line 33, cancel "in" and substitute -- is --.

SIGNED AND SEALED
OCT 20 1970

(SEAL)
Attest:

Edward M. Fletcher, Jr.
Attesting Officer

WILLIAM E. SCHUYLER, JR.
Commissioner of Patents